No. 759,065. PATENTED MAY 3, 1904.
A. G. BETTS.
METHOD OF ACCUMULATING AND USING ELECTRICAL ENERGY.
APPLICATION FILED AUG. 17, 1903.
NO MODEL.
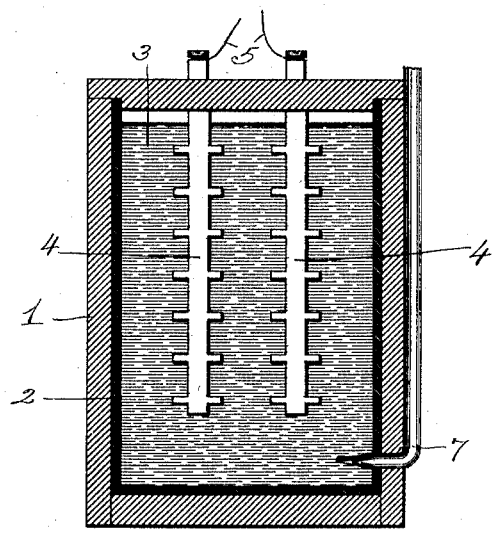
WITNESSES
INVENTOR
Anson G. Betts,
By Mosher & Curtis
attys No. 759,065. Patented May 3, 1904.

UNITED STATES PATENT OFFICE.

ANSON GARDNER BETTS, OF TROY, NEW YORK.

METHOD OF ACCUMULATING AND USING ELECTRICAL ENERGY.

SPECIFICATION forming part of Letters Patent No. 759,065, dated May 3, 1904.

Application filed August 17, 1903. Serial No. 169,717. (No model.)

*To all whom it may concern:*

Be it known that I, ANSON GARDNER BETTS, a citizen of the United States, residing at Troy, county of Rensselaer, and State of New York, have invented certain new and useful Improvements in Methods of Accumulating and Using Electrical Energy, of which the following is a specification.

Reference may be had to the accompanying drawing, and the reference characters marked thereon, which forms a part of this specification.

Similar characters refer to similar parts in the drawing.

The single figure of the drawing is a view in cross-section of an electric storage-battery cell for carrying out my invention.

This invention consists in the method of constructing and using storage-battery apparatus for the purpose of accumulating and using electrical energy.

Certain objects of my invention are to secure greater economy in construction and use of storage-battery apparatus and to permit more varied conditions than have heretofore been desirable in the accumulation and use of electrical energy.

Other objects of the invention will appear in connection with the following description of my improved method.

In the preferred form of apparatus for carrying out my invention I employ graphite electrodes in contact with an electrolyte comprising a solution of a lead salt of a non-oxidizing and non-oxidizable acid, with or without the corresponding salts of another metal more readily electrolytically deposited than lead, such as a strong solution of lead fluosilicate containing some free acid or a somewhat acid solution of fluosilicates of lead and another metal, as copper, capable of being deposited by electrolysis practically free from lead from such solution. I have found by experiment and use of such a storage battery that on passing an electric current of moderate strength through such an electrolyte with such electrodes peroxid of lead is deposited on one electrode in a dense adherent and well-conductant form, while metallic lead or said other metal is deposited on the other electrode, free fluosilicic acid remaining in solution. When the electrodes of the charged battery are connected in circuit to generate electrical energy, the lead or said other metal and lead peroxid are restored to their original condition by combination with the free fluosilicic acid in the solution, restoring the battery to substantially its original condition.

For convenience in referring to the separate electrodes I term the electrode upon which peroxid is deposited the "positive" electrode and the other the "negative" electrode. I also refer to each electrode as a "single" element for convenience in describing the apparatus, but wish it to be understood that any desired number of positive elements and any desired number of negative elements may be employed in accordance with the capacity desired for the cell.

For charging the cell a rate of from ten to twenty amperes per square foot of negative electrode surface is suitable, the potential required being about two volts. The discharge may be conducted at a very high rate without injury to the cell.

A concentrated aqueous solution of lead fluosilicate at the ordinary summer temperature contains per liter about nine hundred grams of lead and six hundred and thirty-five grams of fluosilicic acid with a specific gravity of about 2.38. By the use of this solution, of which about twenty pounds represent a storage capacity of one electrical horse-power hour, and a suitable construction of electrodes and cell I am able to produce a battery of high storage capacity per unit of weight.

When the electrolyte comprises a solution of lead fluosilicate, peroxid of lead is deposited on the positive electrode and metallic lead upon the negative electrode by electrolysis during the charging operation.

When the electrolyte comprises a solution of fluosilicates of lead and copper in chemically equivalent quantities, peroxid of lead is deposited on the positive electrode and metallic copper on the negative electrode during the charging operation.

Copper fluosilicate has the necessary solubility for use in an electrolyte for this purpose.

The greater tendency of copper to deposit in solid form is an advantage of its use.

The lead peroxid on the positive electrode during the period of discharge shows a tendency to become soft and assume a brown color instead of its original brilliant black, and at the end of the discharge some of this material may not be so firmly attached to the electrode as to be in good electrical connection therewith. If under such circumstances the battery be subjected to a charging-current in the opposite direction from that last employed, the complete removal of any loosely-attached pieces of peroxid may be obtained with a resultant better adherence of the deposit subsequently formed.

By employing electrodes both of which are insoluble, as electrodes of graphite, I am able to thus charge the battery at certain times in one direction and at other times in the opposite direction.

I prefer to use an exciting solution which has been very carefully freed from foreign metals that can deposit with the lead or other metal to be deposited on the negative electrode in order to insure well-adherent deposits of both peroxid and metal. The desired degree of purity can be obtained by depositing from the solution a large amount of lead or other metal to be deposited on the negative electrode, using a soluble anode of lead or said other metal, whereby the deposited metal gradually carries out with it the metallic impurities. The desired result can also be secured with less ease by crystallization of lead fluosilicate.

More or less circulation of the solution is caused by the difference in density of the electrolyte from the different electrodes during the action of the battery.

The circulation of the electrolyte can be increased, if desired, by any of the known mechanical means or by the introduction from time to time of bubbles of air into the solution at the bottom of the cell.

In operating my storage battery a small amount of gas is given off from the positive electrode, especially during the first few minutes of charging, until the graphite has been evenly coated with peroxid of lead. The result is that after the battery is completely discharged a small amount of metal still remains undissolved on the negative electrode. The amount is very small, but it gradually accumulates until with a very large number of operations the amount of lead or other metal permanently removed from the solution is considerable. The introduction of air for circulation purposes corrects this by dissolving small amounts of metal from the well-known reaction between dissolved oxygen, metal, and an acid forming a soluble salt with the metal.

For certain purposes of this invention a solution of metallic salts of various non-oxidizing and non-oxidizable acids may be employed, including fluorin acids, such as fluoboric acid, fluotitanic acid, fluosilicic acid, and others, and for certain purposes of the invention electrodes of material other than graphite may be employed—such as carbon, platinum, or other insoluble material—for one or both electrodes or the combination of an insoluble positive electrode with a negative electrode of copper, silver, or other metal of less electromotive force of solution than the metallic deposit.

By the terms "non-oxidizing" and "non-oxidizable" acid I refer to an acid the chemical composition of which is not appreciably affected by its simple contact with metallic lead or lead peroxid—that is, an acid which has no appreciable oxidizing or reducing action on said active materials by simple contact therewith. I prefer, however, to use solid graphite, and more particularly artificial graphite for the electrodes, for the reason that their use insures a more firm adherence of the electrodeposit than the other substances named.

Referring to the drawing 1 represents the body of the cell, which may be formed of wood, provided with a lining of rubber 2, and 3 is the electrolyte, prepared as above described. The electrodes 4 4 are alike in form and structure, both being preferably formed of graphite. The electrodes are adapted to be connected in circuit by the wires 5, either with a generator, whereby the battery is charged, or in circuit for the generation of electrical energy during discharge.

The direction of the charging-current through the cell can be varied from time to time by changing the wire connections with the respective electrodes.

During discharge the wire connections, with the respective electrodes, are made in accordance with the work required to be performed.

Air may be introduced into the electrolyte through the pipe 7, which enters the lower part of the cell, which pipe leads from a source of air-supply, as an air-pump. (Not shown.)

I make no claim in this application to the apparatus employed in carrying out my invention, as the same forms the subject-matter of another application filed herewith.

What I claim as new, and desire to secure by Letters Patent, is—

1. That improvement in the art of accumulating and using electrical energy, which consists in depositing from an electrolyte by electrolysis peroxid of lead upon one electrode, and lead or equivalent metal, upon the other electrode; and afterward generating electrical energy by redissolving said peroxid and metal in said electrolyte.

2. That improvement in the art of accumulating and using electrical energy which consists in supporting suitable electrodes in an electrolytic solution of a readily-soluble lead salt of a non-oxidizing and non-oxidizable acid; subjecting said electrodes to a charging-current, and afterward connecting said electrodes in circuit as a generator of electrical energy.

3. That improvement in the art of accumulating and using electrical energy which consists in depositing active materials from an electrolyte by electrolysis upon graphite electrodes, and subsequently generating electrical energy by redissolving said active materials in said electrolyte.

4. That improvement in the art of accumulating and using electrical energy which consists in supporting graphite electrodes in an electrolytic solution of a readily-soluble lead salt of a non-oxidizing and non-oxidizable acid; subjecting said electrode to a charging-current, and afterward connecting said electrodes in circuit as a generator of electrical energy.

5. That improvement in the art of accumulating and using electrical energy which consists in supporting insoluble electrodes, one formed of graphite, in an electrolyte comprising an aqueous solution of a readily-soluble lead salt of a non-oxidizing and non-oxidizable acid; subjecting said electrodes to a charging-current; and afterward connecting said electrodes in circuit as a generator of electrical energy.

6. That improvement in the art of accumulating and using electrical energy which consists in supporting electrodes of graphite in an electrolyte comprising an aqueous solution of a readily-soluble salt of a non-oxidizing and non-oxidizable acid; subjecting said electrodes to a charging-current; and afterward connecting said electrodes in circuit as a generator of electrical energy.

7. That improvement in the art of accumulating and using electrical energy which consists in supporting electrodes of artificial graphite in an aqueous solution of lead fluosilicate; subjecting said electrodes to a charging-current; and afterward connecting said electrodes in circuit as a generator of electrical energy.

8. That improvement in the art of accumulating and using electrical energy which consists in supporting graphite electrodes in a solution of lead fluosilicate; subjecting said electrodes at certain times to a charging-current in one direction and at other times to a charging-current in the opposite direction, and afterward connecting said electrodes in circuit as a generator of electrical energy.

9. That improvement in the art of accumulating and using electrical energy which consists in supporting in a storage battery suitable electrodes in contact with an electrolyte containing in solution active materials capable of being deposited by electrolysis upon said electrodes and capable of generating electrical energy by resolution in said electrolyte, and passing a current from a generator of electrical energy through said battery at certain times in one direction, and at other times in the opposite direction.

10. That improvement in the art of accumulating and using electrical energy which consists in supporting electrodes both of substantially the same material in an electrolyte containing in solution active materials capable of being deposited by electrolysis upon said electrodes, and capable of generating electrical energy by resolution in said electrolyte, subjecting said electrodes at certain times to a charging-current in one direction, and at other times to a charging-current in the opposite direction, and connecting said electrodes in circuit as a generator of electrical energy from time to time as required.

11. That improvement in the art of accumulating and using electrical energy, which consists in depositing by electrolysis active materials, which by their resolution in the electrolyte reproduce the electrical energy, each at certain times on one of the electrodes and at other times on the other electrode; and generating electrical energy by the resolution of such active materials in the electrolyte.

12. That improvement in the art of accumulating and using electrical energy which consists in introducing an oxygen gas into an electrolytic solution of a lead salt of a non-oxidizing and non-oxidizable acid which forms a readily-soluble salt with lead, in contact with insoluble electrodes in a storage-battery cell.

13. That improvement in the art of accumulating and using electrical energy which consists in depositing active materials from an electrolyte by electrolysis upon suitable electrodes, and subsequently generating electrical energy by redissolving said active materials in said electrolyte, and introducing air from time to time into the electrolyte.

14. That improvement in the art of accumulating and using electrical energy which consists in supporting graphite electrodes in a solution of lead fluosilicate; subjecting said electrodes at certain times to a charging-current in one direction and at other times to a charging-current in the opposite direction, and afterward connecting said electrodes in circuit as a generator of electrical energy, and introducing air from time to time into the electrolyte.

In testimony whereof I have hereunto set my hand this 15th day of August, 1903.

ANSON GARDNER BETTS.

Witnesses:
FRANK C. CURTIS,
E. M. O'REILLY.